(12) United States Patent
Spence et al.

(10) Patent No.: US 9,658,971 B2
(45) Date of Patent: May 23, 2017

(54) UNIVERSAL SPI (SERIAL PERIPHERAL INTERFACE)

(71) Applicants: Nicholas J. Spence, Phoenix, AZ (US); Jason R. Fender, Chandler, AZ (US); Michael L. Fraser, Tempe, AZ (US)

(72) Inventors: Nicholas J. Spence, Phoenix, AZ (US); Jason R. Fender, Chandler, AZ (US); Michael L. Fraser, Tempe, AZ (US)

(73) Assignee: NXP USA, Inc., Austin, TX (US)

( * ) Notice: Subject to any disclaimer, the term of this patent is extended or adjusted under 35 U.S.C. 154(b) by 775 days.

(21) Appl. No.: 14/023,781

(22) Filed: Sep. 11, 2013

(65) Prior Publication Data

US 2015/0074319 A1    Mar. 12, 2015

(51) Int. Cl.
G06F 13/16    (2006.01)
G06F 13/42    (2006.01)

(52) U.S. Cl.
CPC ...... G06F 13/1642 (2013.01); G06F 13/4291 (2013.01)

(58) Field of Classification Search
CPC .................. G06F 13/1642; G06F 13/4291
See application file for complete search history.

(56) References Cited

U.S. PATENT DOCUMENTS

| | | |
|---|---|---|
| 7,434,084 B1 | 10/2008 | Yau et al. |
| 7,499,519 B1 * | 3/2009 | Hsieh ..................... G11C 19/00 377/64 |
| 7,584,305 B2 | 9/2009 | Hsieh |
| 8,135,881 B1 | 3/2012 | Obkircher |
| 8,135,896 B2 | 3/2012 | Kuo et al. |
| 2005/0114567 A1 * | 5/2005 | Lambrache ......... G06F 13/4054 710/52 |

FOREIGN PATENT DOCUMENTS

| | | |
|---|---|---|
| GB | 2327579 A | 1/1999 |
| WO | 2007036048 A1 | 4/2007 |

OTHER PUBLICATIONS

Texas Instrument, "SN74AHC595-Q1 8-Bit Shift Register With 3-State Output Registers," Jan. 2008, Revision B, http://www.ti.com/lit/ds/symlink/sn74ahc595-q1.pdf.*

* cited by examiner

*Primary Examiner* — Tim T Vo
*Assistant Examiner* — Phong H Dang (57) ABSTRACT

A Universal SPI Interface is provided that is compatible, without the need for additional interface logic or software, with the SPI bus, existing DSA and other serial busses similar to (but not directly compatible with) the SPI bus, and parallel busses requiring compatibility with 74xx164-type signaling. In an additional aspect, a reduced-pincount Universal SPI Interface is provided that provides the same universal interface, but using fewer external output pins. The Universal SPI Interface includes multiple latches, buffers, and in an alternative embodiment, a multiplexer, configured together such that a Universal SPI interface is provided that can be readily reconfigured using only input signals to provide compatibility across multiple bus interfaces.

16 Claims, 7 Drawing Sheets

UNIVERSAL SPI (SERIAL PERIPHERAL INTERFACE)

TECHNICAL FIELD OF THE INVENTION

The present invention relates generally to bus interface devices and methods utilized in electronic systems. More specifically, the present invention relates to systems and methods for providing a reconfigurable SPI (Serial Peripheral Interface) bus capable of also interfacing to various interfaces other than SPI.

BACKGROUND OF THE INVENTION

Serial data busses are widely used in electronic applications such as automotive electronics, computers, handheld devices, inertial guidance systems, household appliances, consumer electronics, protection systems, and many other industrial, scientific, engineering and portable systems. Such serial data busses may be used to permit communication and sharing of data among various electronic circuits within a given device, among various peripheral devices and a host device within a system, and among multiple systems within a larger system. SPI (Serial Peripheral Interface) is one specific type of serial data bus system and protocol developed to facilitate communication of data and information in a serial fashion. SPI provides a synchronous four-wire interface to simple peripheral devices, and has been adopted by many companies to allow connection of, for example, peripheral devices.

BRIEF DESCRIPTION OF THE DRAWINGS

A more complete understanding of the present invention may be derived by referring to the detailed description and claims when considered in connection with the Figures (not necessarily drawn to scale), wherein like reference numbers refer to similar items throughout the Figures, and:

DETAILED DESCRIPTION

SPI peripheral devices capable of connecting to and functioning on a SPI bus typically have four SPI signal pins: SDI, SDO, SSB and SCLK. SDI, an abbreviation for "Serial Data In", is the serial data input to the peripheral device, which receives its signal typically from a SPI host controller present on the SPI bus. SDO, an abbreviation for "Serial Data Out", is the output from the SPI peripheral device. It is normally tri-stated (meaning that it does not provide any output and source or sink any current), unless the SSB signal (discussed below) is low. In that case (SSB low), the SDO provides the data output to the SPI bus. By operating in this fashion, multiple SPI peripheral outputs can be connected at the same time to the SPI bus without causing signal interference. SSB, an abbreviation for "Stave Select Bar", is pulled low by the SPI host controller when the host controller wishes to communicate with the SPI peripheral. When SSB is high, the peripheral SPI device ignores all signals on the SDI and SCLK lines (SCLK is discussed below), and as mentioned above, SDO is tri-stated. SCLK, an abbreviation for "Serial Clock" is provided by the SPI bust host controller to SPI peripheral devices on the SPI bus. When a SPI peripheral (or slave) device is enabled by having its SSB input pulled low, it will clock in data via the SDI input on the rising edge of the SCLK and then output data via the SDO pin on the falling edge of the SCLK signal. In this case, the data provided on the SDI input must be stable before the rising edge of the SCLK signal, and must remain unchanged for a certain hold time after the rising clock edge (but provided that this hold time is met, the data is permitted to change prior to the falling clock edge). By clocking data in on the rising clock edge of the SCLK signal, and clocking data out on the falling edge of the SCLK signal, timing problems can be avoided when multiple SPI peripheral devices are placed in series.

Certain electronic devices may be configured to share data and communicate utilizing serial or parallel busses that are not directly compatible with a SPI serial bus. For example, Digital Step Attenuator (DSA) devices frequently are required to interface with other devices, including RF devices, and include a serial or parallel bus interface. Some DSA products on the market utilize a serial bus which, although having some similarities to a SPI serial bus, is not compatible with a SPI serial bus. In other words, these products will not function in a SPI serial bus system without additional interface circuitry, which can be expensive both in terms of cost and board space. For example, certain DSA products on the market require that the SDI data signal be stable before the rising edge of the SCLK signal (similar to the SPI protocol), but also require that the SDI data REMAIN UNCHANGED until AFTER the falling edge of the SCLK signal (different from the SPI protocol requirement). The typical DSA interface is called a 'Shift Register', and is similar to the SPI, except that the SDO changes soon after the rising SCLK edge rather than the falling edge. Most microcontroller SPI interfaces on the market cannot meet the more stringent DSA timing requirements without the addition of discrete logic components to the system.

As noted above, certain DSA devices include a parallel bus interface to interface with other components or devices, where the parallel interface signals come from general purpose I/O pins (GPM) or use a serial-to-parallel shift register device, such as a 74xx160 type device for interface purposes. Most microcontroller interfaces on the market are not readily compatible with such devices, including DSA devices, without the addition of external shift registers or software to force the GPIO pins to function as such a shift register.

Although companies designing DSA shift register and other products for RF and other markets to be used to construct, for example, power amplifier palettes, could theoretically make the devices work together by adding additional logic and circuitry, this solution is not optimal. Ideally, these DSA and other products would have built-in compatibility with a variety of microcontrollers and associated parallel and serial interfaces, including SPI, without requiring the added cost, complexity, and real estate required by additional interface logic. It would be very beneficial to provide a single device that is both compatible with existing shift register designs that customers may already have, and usable in a microcontroller based design which requires standard SPI. Additionally, having DSA and other products that have built-in compatibility with multiple bus protocols provides the additional advantage of being able to easily drop these new product into existing designs regardless of the existing bus protocol, and without requiring a redesign or major board changes.

In one aspect, a Universal SPI Device is provided that is compatible, without the need for additional interface logic or software, with the SPI bus, existing DSA and other products utilizing a serial bus having a similar interface and protocol to SPI (but incompatible with SPI), and parallel busses requiring compatibility with 74xx164-type signaling. In an additional aspect, a reduced-pincount Universal SPI device is provided that provides the same universal interface, but using fewer external output pins. The Universal SPI Device can be configured to work with different types of busses, interfaces, and protocols depending on how the inputs of the Universal SPI Device are configured, and to which signals the inputs are connected. Thus, devices achieving design objectives of keeping costs low while increasing flexibility of use of in existing system designs, and achieving interface compatibility with existing devices are provided.

Figure 1:
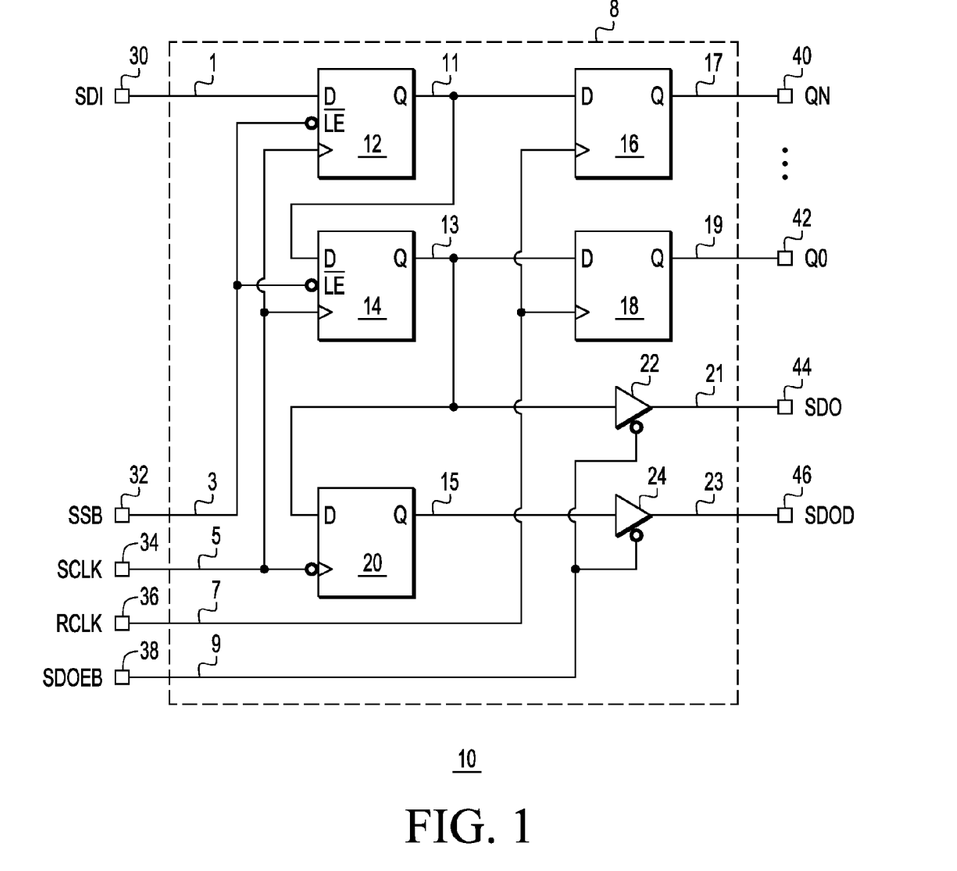
FIG. 1 shows a block diagram of a Universal SPI Device configured in accordance with the teaching of an embodiment.

FIG. 1 shows a block diagram of a Universal SPI Device configured in accordance with the teaching of an embodiment. Universal SPI Device 10 is shown having Universal SPI Logic 8, having multiple input and output signals provided external to Universal SPI Logic 8, and received externally from devices external to Universal SPI Logic 8 via multiple electrical contacts (described below). Universal SPI Logic 8 includes a shift register section comprising two latches, Latch 12 and Latch 14, connected in series. Each of Latch 12 and Latch 14 comprises a data input (designated "D"), a latch enable input (designated "LE bar"), a clock input (designated ">"), and a data output (designated "Q"). Latch 12 and Latch 14 are electrically coupled together such that the data output Q of Latch 12 (designated as signal 11) is provided as the data input D of Latch 14. "LE bar" of each of Latch 12 and Latch 14 is tied together and receives an input signal from external to Latch 12 and Latch 14, designated Signal 3. When Signal 3 is low, Latch 12 and Latch 14 are enabled, and will be responsive to the clock signals applied to the>input, and the data signals applied to their respective data inputs D. When Signal 3 is high, Latch 12 and Latch 14 are non-responsive to the>input and the data signals applied to their respective data inputs D, and will not alter the state of their respective data outputs Q. The>signal of each of Latch 12 and Latch 14 is tied together and to a clock source external to Latch 12, and Latch 14, and designated as Signal 5. When Signal 3 is low at the rising edge of the clock Signal 5, Latch 12 and Latch 14 are enabled, and each of Latch 12 and Latch 14 will, on the rising edge of the clock Signal 5, clock into itself the value present at its respective data input D at the rising edge of Signal 5, and provide that value at its output Q. When Signal 3 is high at the rising edge of Signal 5, each of Latch 12 and Latch 14 will not change the value being provided at its Q output. It should be appreciated that because the output Q of Latch 12 is provided as the input D of Latch 14, each time Latch 12 and Latch 14 are enabled and clocked, the output value of Latch 12 will be the input value of Latch 14. In effect, with each clock, the data that was stored in Latch 12 is passed to Latch 14, and new data (provided from external to Latch 12 at the data input D of Latch 12, also referred to as Signal 1) is stored in Latch 12. In this way, Latch 12 and Latch 14 function as a shift register, shifting data bits from outside Latch 12, into Latch 12, and then on to Latch 14. It should be appreciated that although in this embodiment, there are only 2 latches, Latch 12 and Latch 14, and hence that only 2 bits are stored and shifted, additional latches could be added between or to Latch 12 and Latch 14 serially such that more than 2 bits may be stored and shifted through the shift register section.

Universal SPI Logic 8 also includes a shadow register section comprising two latches, Latch 16 and Latch 18. Each of Latch 16 and Latch 18 comprises a data input (designated "D"), a clock input (designated ">"), and a data output (designated "Q"). The>signal of each of Latch 16 and Latch 18 is tied together and to a clock source external to Latch 16 and Latch 18, and designated as Signal 7. Each of Latch 16 and Latch 18 will, on the rising edge of the clock Signal 7, clock into itself the value present at its respective data input D at the rising edge of Signal 7, and provide that value at its output Q. As shown, the data input D of Latch 16 is electrically coupled to the data output Q of Latch 12 (designated Signal 11). As also shown, the data input D of Latch 18 is electrically coupled to the data output Q of Latch 14 (designated Signal 13). It should he appreciated that each time clock Signal 7 has a rising edge, the value of the data stored in Latch 12 will be latched into Latch 16 and provided as its output QN (designated Signal 17), and the data stored in Latch 14 will be latched into Latch 18 and provided as its output Q0 (designed Signal 19). It should also be appreciated that the data present at the outputs QN and Q0, respectively, will remain (not change) until the next time a rising edge of clock Signal 7. In this way, the data provided by Latch 12 and Latch 14 and clocked into Latch 14 and Latch 18 may be maintained at the outputs QN and Q0 long after the values of Latch 12 and Latch 14 have changed provided that a rising edge is not received on Signal 7. As with Latch 12 and Latch 14 above, it should be appreciated that although in this embodiment, there are only 2 latches, Latch 16 and Latch 18, acting as shadow registers, and hence that only 2 bits are stored and provided as outputs, additional latches could be added as additional latches beyond Latch 12 and Latch 14 are added to the shift register section such that more than 2 bits may be stored and provided as outputs.

Universal SRI Logic 8 further includes a delay register section comprising a latch, Latch 20. Latch 20 comprises a data input (designated "D"), a clock input (designated ">"), and a data output (designated "Q"). The>signal of each of Latch 20 is tied together and to a clock source external to Latch 20, and to the same clock signal provided to Latch 12 and Latch 14 and designated as Signal 5. Latch 20 will, on the falling edge of the clock Signal 5, clock into itself the value present at its data input D at the falling edge of Signal 5, and provide that value at its output Q. As shown, the data input D of Latch 20 is electrically coupled to the data output Q of Latch 14 (designated Signal 13). It should be appreciated that each time clock Signal 5 has a falling edge, the value of the data stored in Latch 14 will be latched into Latch 20 and provided as its output Q (designated Signal 15). It should also be appreciated because the Latch 20 clocks data in on the falling edge of the clock Signal 5, while Latch 14 clocks data in on the rising edge, Latch 20 has the effect of maintaining and providing as an output the same output data of Latch 14, but delayed by one half of a clock cycle from what is provided at the output of Latch 14.

Universal SPI Logic 8 further includes tri-state buffers tri-state buffer 22 and tri-state buffer 24. The input of tri-state buffer 22 is electrically coupled to the data output D of Latch 14 (Signal 13). Tri-state buffer 22 further comprises an output configured to either be in a high-impedance state, or to provide at its output as output Signal 21 the same signal provided at its input (Signal 13). Tri-state buffer 22 is further configured to receive a control signal (designated Signal 9) to determine whether tri-state buffer 22 provides at its output the same signal received as its input (Signal 13), or if its output enters a high-impedance state. The input of tri-state buffer 24 is electrically coupled to the data output D of Latch 20 (Signal 15). Tri-state buffer 24 further comprises an output configured to either be in a high-impedance state, or to provide at its output as output signal 23 the same signal provided at its input (Signal 15). Tri-state buffer 2.4 is further configured to receive a control signal (designated Signal 9) to determine whether tri-state buffer 24 provides at its output the same signal received as its input (Signal 15), or if its output enters a high-impedance state. It should be appreciated that when the control Signal 9 is low, tri-state buffer 22 will provide as its output Signal 21 the data output D (Signal 13) of Latch 14, while tri-state buffer 24 will provide as its output Signal 21 that data output D (Signal 15) of Latch 20, which is the same signal as Signal 13, but delayed by half a clock cycle.

As noted above, Universal SPI Device 10 is shown having multiple electrical contacts electrically coupled to the circuitry of Universal SPI Logic 8. More specifically, Universal SPI Device 10 includes electrical contact 30 (also referred to as SDI) electrically coupled to the data input D of Latch 12, electrical contact 32 (also referred go as SSB) electrically coupled to LE bar of Latch 12 and Latch 14, electrical contact 34 (also referred to as SCLK) electrically coupled to the>inputs of Latch 12, Latch 14 and Latch 20, electrical contact 36 (also referred to as RCLK) electrically coupled to the>inputs of Latch 16 and Latch 18, and electrical contact 38 (also referred to as SDOEB—Serial Data Out Enable Buffer) electrically coupled to the control inputs of tri-state buffer 22 and tri-state buffer 24. It should be appreciated that Signal 1, Signal 3, Signal 5, Signal 7, and Signal 9 are provided from an external source to Universal SPI Device 10 via electrical contact 30, electrical contact 32, electrical contact 34, electrical contact 36 and electrical contact 38, respectively. Universal SPI Device 10 also includes electrical contact 40 (also referred to as QN) electrically coupled to the data output Q of Latch 16, electrical contact 42 (also referred to as Q0) electrically coupled to the data output Q of Latch 18, electrical contact 44 (also referred to as SDO) electrically coupled to the output of tri-state buffer 22, and electrical contact 46 (also referred to as SDOD—Serial Data Out Delayed) electrically coupled to the output of tri-state buffer 24. It should be appreciated that Signal 17, Signal 19, Signal 21 and signal 23 are provided external to Universal SPI Device 10 via electrical contact 40, electrical contact 42, electrical contact 44 and electrical contact 46, respectively.

In general operation, data provided at the SDI input of Universal SPI Device 10 is shifted into Universal SPI Device 10 bit-by-bit responsive to the SSB signal (which enables the shift register section to shift data in responsive to the clock signal) and the SCLK clock Data shifted into the shift register is made available at the QN through Q0 outputs of Universal SPI Device 10 based on the RCLK signal, and is maintained at those outputs responsive to the RCLK signal. As new data is shifted into Universal SPI Device 10, older data (sequentially) is shifted out of Universal SRI Device 10 on a FIFO basis at the SDO and SDOD outputs (unless those outputs are put into a high-impedance state by the SDOEB signal), with the SDOD output being the same as the SDO output, but delayed by one half of the SCLK cycle.

Figure 2A:
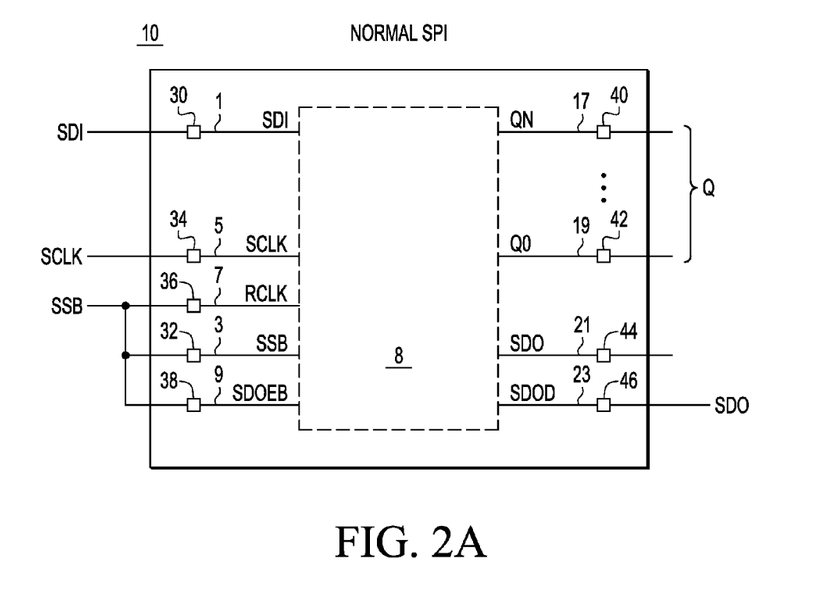
FIG. 2A shows a block diagram of the Universal SPI device of FIG. 1 configured in a SPI mode.
Figure 2B:
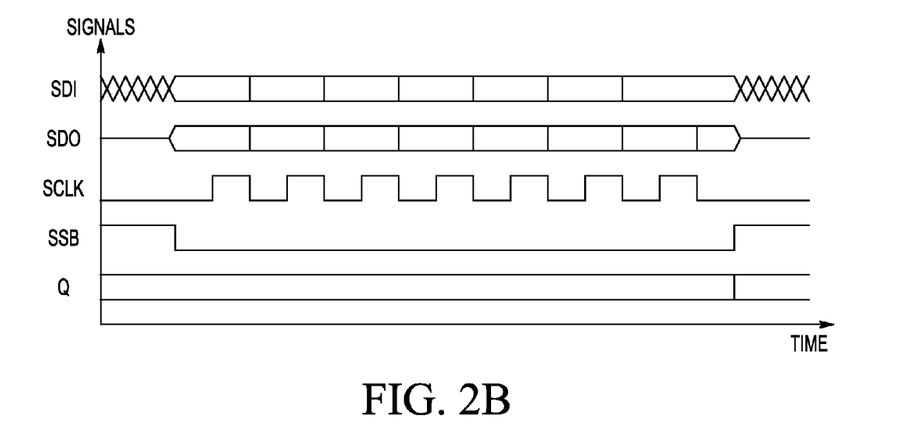
FIG. 2B shows a representative timing diagram of the Universal SPI device of FIG. 2A.

FIG. 2A shows a block diagram a Universal SPI device of FIG. 1 configured in a SPI mode. The internal details of Universal SPI Logic 8 have been omitted from this figure for clarity purposes, and are assumed to be the same as generally illustrated in FIG. 1. In FIG. 2A, in which Universal SRI Device 10 is coupled to a standard SPI bus, the RCLK, SSB, and SDOEB inputs from the have all been tied together and coupled to the SSB (Slave Select Bar) signal provided by the SPI bus master. SCLK and SDI are also provided by the SPI bus master. Finally, the SPI bus SDO line is electrically coupled to the SDOD output of Universal SPI Device 10. FIG. 2B shows a representative timing diagram of the Universal SPI device of FIG. 2A. Referring to FIG. 2A and FIG. 2B together, the operation of Universal SPI Device 10 will be explained. When SSB is high, Universal SPI Device 10 ignores both the SDI (data) signal and the SCLK (clock) signals (no data clocking occurs), and the SDO and SDOD outputs are tri-stated (high impedance—the device does not put traffic on the bus). As soon as SSB becomes low, the SDO output becomes active, and outputs the value in the last shift register (although this value is not put out on the SPI bus, as the SDO line is not connected to the SPI bus in this configuration). While SSB is low, new data is clocked through the shift register from SDI to SDO on the rising edge of SCLK. This new data is delayed by one half of a clock cycle before being provided to the SPI bus because it is provided via the SDOD output (Serial Data Output Delayed), which is electrically coupled to the SDO of the SPI bus. On the rising edge of SSB, the contents of the shift registers are clocked into the shadow registers, and appear at the Q outputs (which are not connected in this configuration). It should be appreciated that in this configuration, as illustrated in FIGS. 2A and 2B (tying the Universal SPI Device 10 RCLK, SSB and SDOEB lines together and to the SPI bus SSB, tying the Universal SPI Device 10 SDI line to the SPI bus SDI line, and tying the Universal SPI Device 10 SDOD line to the SPI bus SDO line), Universal SPI Device 10 is operating in a completely compatible mode with SPI, without any additional logic circuitry needed. It should also be appreciated that because the SSB input of Universal SPI Device 10 is coupled to the SSB signal of the SPI bus, the system has improved noise immunity. This is because when SSB is high, any pulse on SCLK is ignored, and does not change the contents of the shift registers. Any pulses on the SSB line would cause the contents of the shift register to be latched through to the shadow registers, but since the shift register contents won't change while SSB is high, there will be no actual change in the Q outputs of the shadow registers. In addition, it should be appreciated that in systems in which a larger timing margin is needed by the device to which the serial data output (SDO and/or SDOD) is to be connected, the system board designer may opt to utilize the SDO output rather than the SDOD pin to provide the larger timing margin.

Figure 3A:
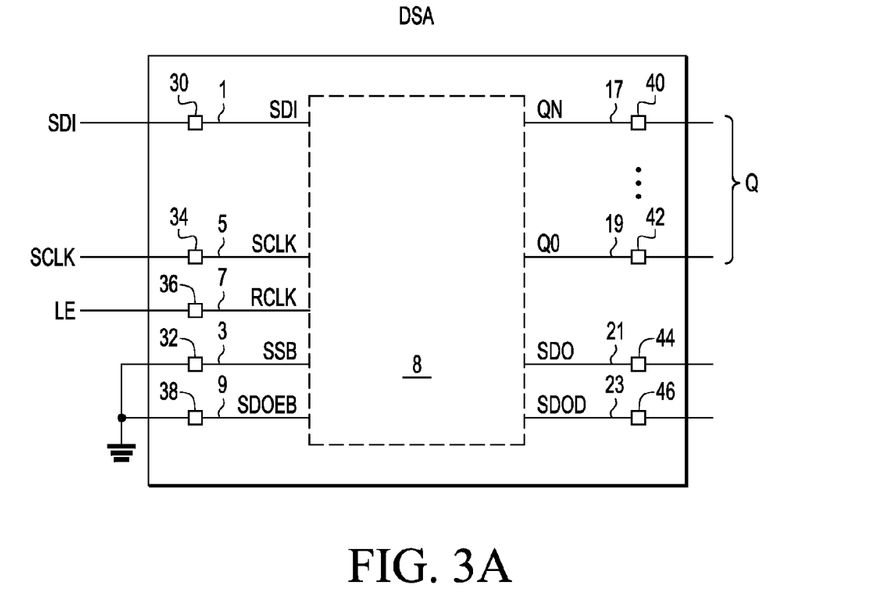
FIG. 3A shows a block diagram of the Universal SPI device of FIG. 1 configured in a DSA mode.
Figure 3B:
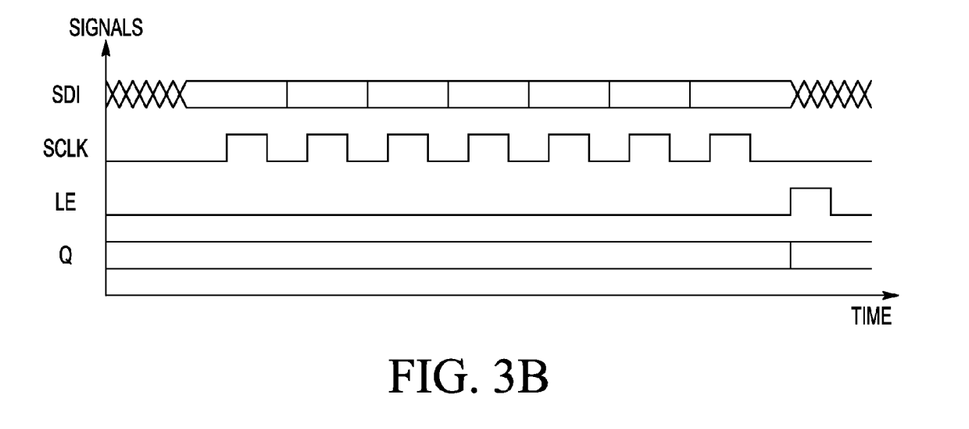
FIG. 3B shows a representative timing diagram of the Universal SPI device of FIG. 3A.

FIG. 3A shows a block diagram a Universal SPI device of FIG. 1 configured in a DSA mode. The internal details of Universal SPI Logic 8 have been omitted from this figure for clarity purposes, and are assumed to be the same as generally illustrated in FIG. 1. In FIG. 3A, in which Universal SRI Device 10 is configured for traditional DSA operation in a system using a serial bus similar to SPI, but not compatible with SPI, the latch enable (LE) signal of the DSA serial bus is electrically coupled to the RCLK input of Universal SPI Device 10, while the SSB and SDOEB pins are connected to ground. The SDI input of Universal SPI Device 10 is electrically coupled to the SDI signal of the DSA serial bus. FIG. 3B shows a representative timing diagram of the Universal SRI device of FIG. 3A. Referring to FIG. 1 and FIG. 3A and FIG. 3B together, the operation of Universal SPI Device 10 will be explained. Because SSB is tied to ground (low) the latches in the shift registers are always enabled, and new data will be clocked into the latches on the rising edge of each SCLK via the SDI input. As long as LE is low, this new data that is being clocked into Universal SPI Device 10 and through the shift registers from the SDI input on each rising edge of SCLK will not be clocked into the shadow registers, and will not appear as outputs QN and Q0. When a rising edge occurs on LE, the contents of the shift register are clocked from the shift register into the shadow register, are provided as outputs Q0 and QN, and are made accessible external to Universal SPI Device 10 via contacts electrical contact 40 and electrical contact 42. In this way, when Universal SPI Device 10 is configured as shown in FIG. 3A, Universal SPI Device 10 functions compatibly with non-SPI DSA serial busses.

It should be noted that many DSA devices do not provide SDO pins in their bus interface sections, making it impossible for a designer to read the contents of the shift registers. It should be appreciated that by utilizing the embodiment in FIG. 1 configured as in FIG. 3, board designers may provide for a connection to the SDO and/or SDOD pins to allow the application to read the value of the internal shift register and/or for scan chain connectivity testing.

Figure 4A:
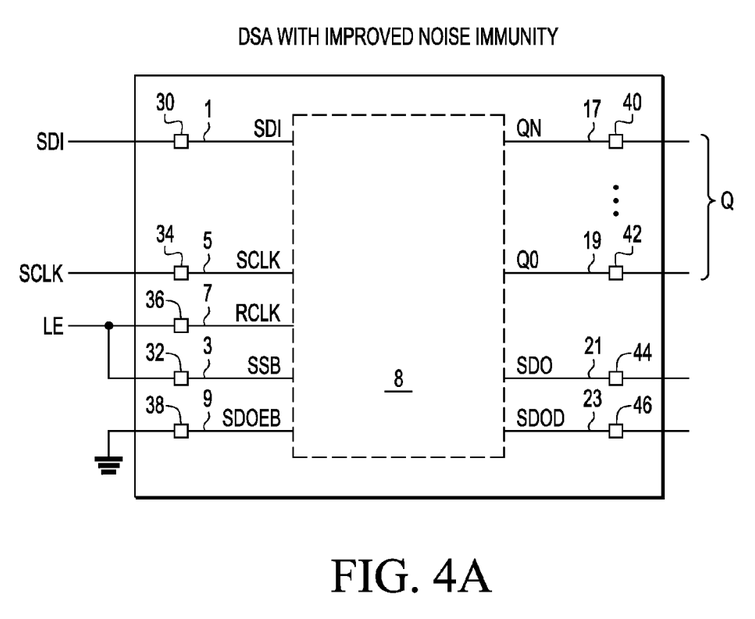
FIG. 4A shows a block diagram of the Universal SPI device of FIG. 1 configured in a DSA mode with improved noise immunity.
Figure 4B:
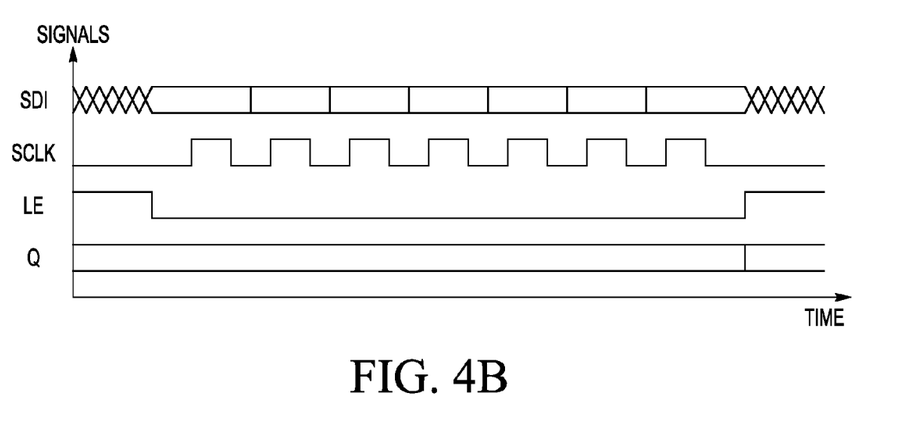
FIG. 4B shows a representative timing diagram of the Universal SPI device of FIG. 4A.

FIG. 4A shows a block diagram a Universal SPI device of FIG. 1 configured in a DSA mode (similar to FIG. 3A) but with enhanced provision for noise immunity. The internal details of Universal SPI Logic 8 have been omitted from this figure for clarity purposes, and are assumed to be the same as generally illustrated in FIG. 1. The configuration of FIG. 4A is one in which Universal SPI Device 10 is configured for traditional DSA operation with enhanced noise immunity in a system using a serial bus similar to SPI, but not compatible with SPI. The configuration of FIG. 4A is identical in all respects to the configuration of FIG. 3A, except that the latch enable (LE) signal of the DSA serial bus is electrically coupled to both the RCLK input of Universal SPI Device 10 and the SSB input of Universal SPI Device 10 (rather than SSB being tied to ground as in FIG. 3A). FIG. 4B shows a representative timing diagram of the Universal SPI device of FIG. 4A. Referring to FIG. 1 and FIG. 4A and FIG. 4B together, the operation of Universal SPI Device 10 is identical to the operation in FIG. 3A, except that in this configuration with SSB tied to the latch enable (LE) signal, the latches in the shift registers will only clock new data into the latches on the rising edge of each SCLK when latch enable (LE) is low. This improves noise immunity by preventing the shift register from shifting in new data when the device is not being accessed (as determined by the LE signal, which only accesses the device when LE is low). In order to provide this additional noise immunity, the LE signal must be held high all of the time by the serial bus master except when the bus master is attempting to load new data into Universal SPI Device 10 (and asserts LE low).

Figure 5A:
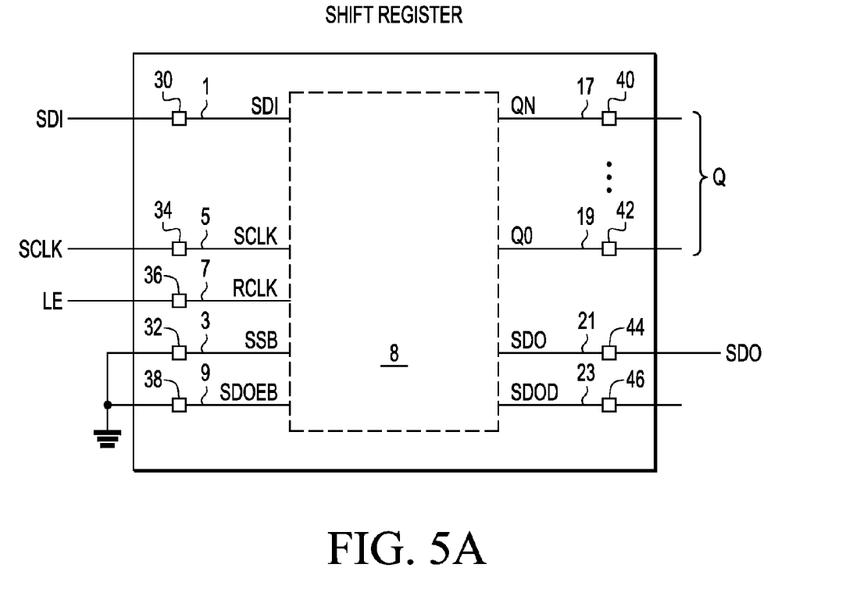
FIG. 5A shows a block diagram of the Universal SPI device of FIG. 1 configured in a shift register mode.
Figure 5B:
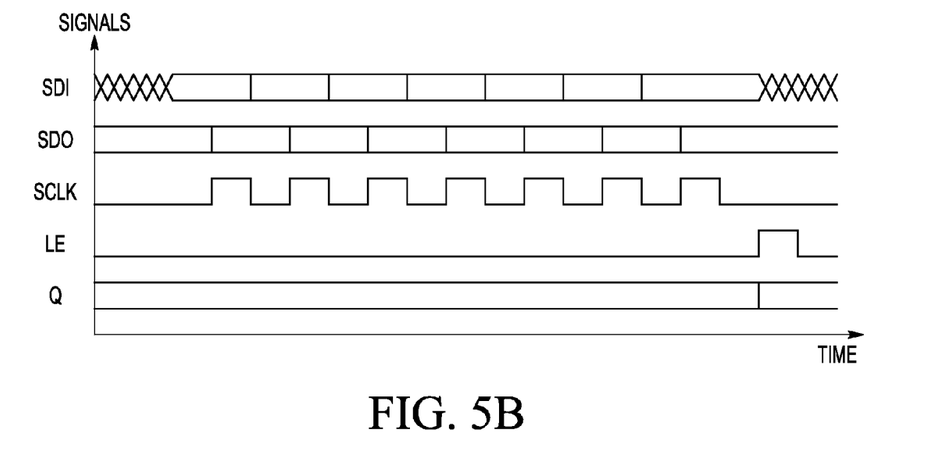
FIG. 5B shows a representative timing diagram of the Universal SPI device of FIG. 5A.

FIG. 5A shows a block diagram of the Universal SPI device of FIG. 1 configured in a shift register mode. The internal details of Universal SPI Logic 8 have been omitted from this figure for clarity purposes, and are assumed to be the same as generally illustrated in FIG. 1. In FIG. 5A, the latch enable (LE) signal of the bus is electrically coupled to the RCLK input of Universal SPI Device 10, while the SSB and SDOEB pins are connected to ground. The SDI input of Universal SPI Device 10 is electrically coupled to the SDI signal of the bus. FIG. 5B shows a representative timing diagram of the Universal SPI device of FIG. 3A. Referring to FIG. 1 and FIG. 5A and FIG. 5B together, the operation of Universal SPI Device 10 will be explained. Because SSB is tied to ground (low) the latches in the shift registers are always enabled, and new data will be clocked into the latches on the rising edge of each SCLK via the SDI input. As long as LE is low, this new data that is being clocked into Universal SPI Device 10 and through the shift registers from the SDI input on each rising edge of SCLK will not be clocked into the shadow registers, and will not appear as outputs QN and Q0. When a rising edge occurs on LE, the contents of the shift register are clocked from the shift register into the shadow register, are provided as outputs Q0 and QN, and are made accessible external to Universal SPI Device 10 via contacts electrical contact 40 and electrical contact 42 (as SDO and SDOD, respectively). If the application is one in which the SDO signal is updated on the rising edge of the bus SCLK signal, the SDO signal of Universal SPI Device 10 may be utilized. In applications in which timing needs to be improved, the SDOD (delayed SDO signal) may be employed.

Figure 6A:
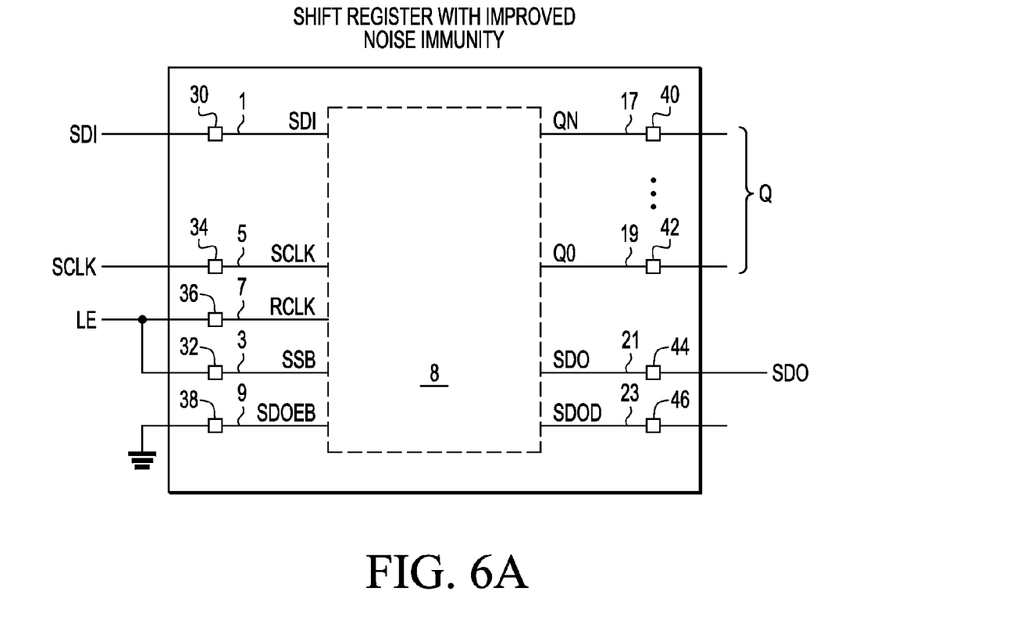
FIG. 6A shows a block diagram of the Universal SPI device of FIG. 1 configured in a shift register mode with noise immunity.
Figure 6B:
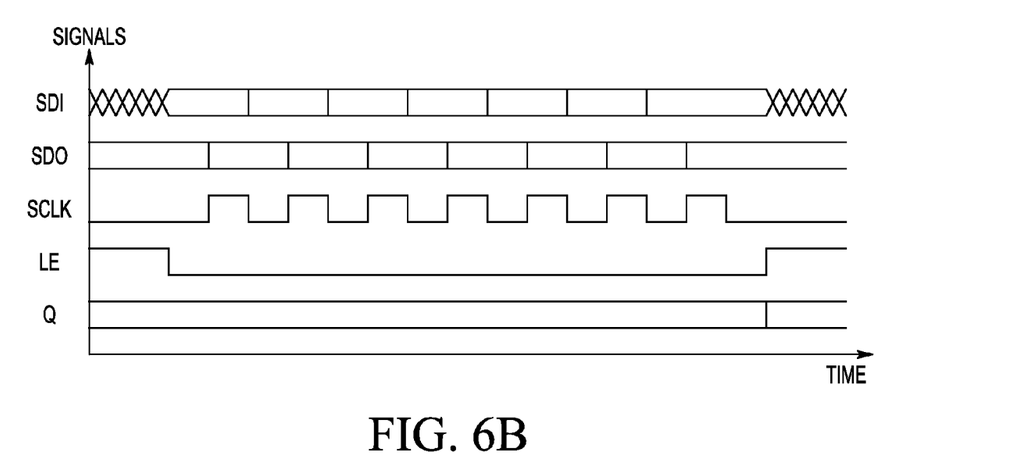
FIG. 6B shows a representative timing diagram of the Universal SPI device of FIG. 6A; and, FIG. 7 shows a block diagram of a Universal SPI device configured in accordance with the teaching of an alternative embodiment.

FIG. 6A shows a block diagram of the Universal SPI device of FIG. 1 configured to operate in an alternate mode, namely, a shift register mode with noise immunity. The internal details of Universal SPI Logic 8 have been omitted from this figure for clarity purposes, and are assumed to be the same as generally illustrated in FIG. 1. The configuration of FIG. 6A is identical in all respects to the configuration of FIG. 5A, except that the latch enable (LE) signal of the bus is electrically coupled to both the RCLK input of Universal SPI Device 10 and the SSB input of Universal SPI Device 10 (rather than SSB being tied to ground as in FIG. 5A). FIG. 6B shows a representative timing diagram of the Universal SPI device of FIG. 6A. Referring to FIG. 1 and FIG. 6A and FIG. 6B together, the operation of Universal SPI Device 10 is identical to the operation in FIG. 5A, except that in this configuration with SSB tied to the latch enable (LE) signal, the latches in the shift registers will only clock new data into the latches on the rising edge of each SCLK when latch enable (LE) is low. This improves noise immunity by preventing the shift register from shifting in new data when the device is not being accessed (as determined by the LE signal, which only accesses the device when LE is low). In order to provide this additional noise immunity, the LE signal must be held high all of the time by the serial bus master except when the bus master is attempting to load new data into Universal SPI Device 10 (and asserts LE low). It should be appreciated that in system designs involving multiple shift registers in series with multiple different LE connections, this configuration may not be feasible.

Figure 7:
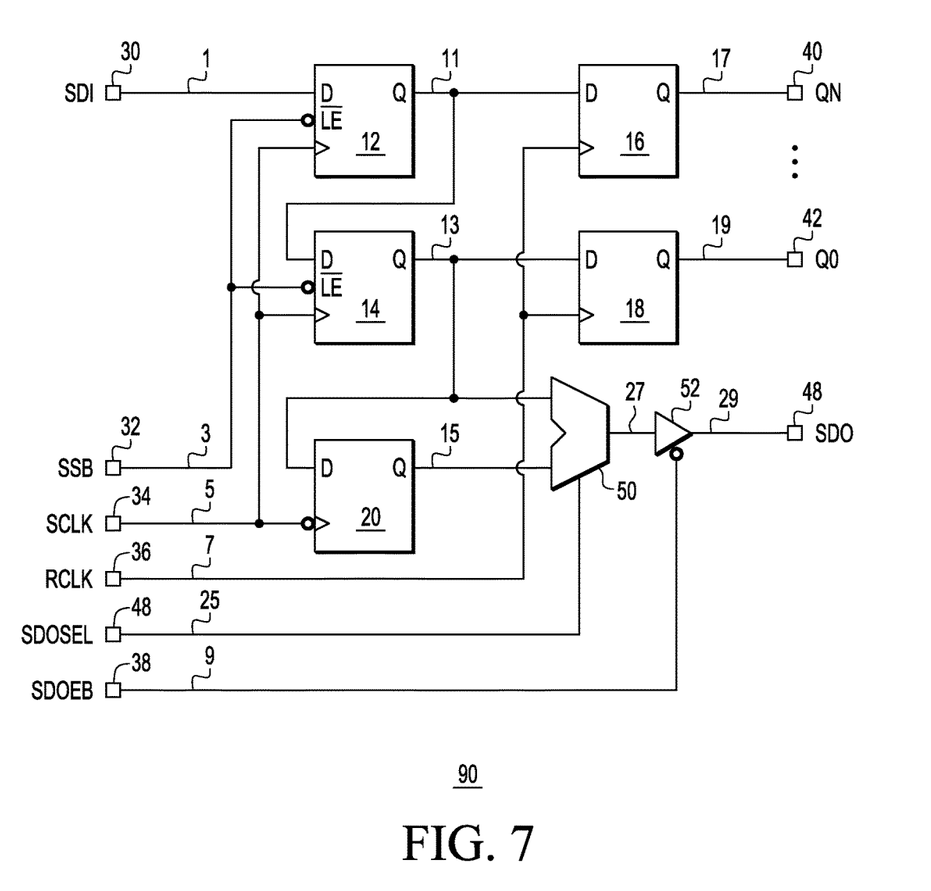

FIG. 7 shows a block diagram of a Universal SPI device configured in accordance with the teaching of an alternative embodiment. Universal SPI Device 90 is shown having Universal SPI Logic 92, having multiple input and output signals provided external to Universal SPI Logic 92, and received externally from devices external to Universal SPI Logic 92 via multiple electrical contacts (described below). Universal SPI Device 90 and Universal SPI Logic 92 are similar to Universal SPI Device 10 and Universal SPI Logic 8, except that tri-state buffer 22 and tri-state buffer 24 have been replaced by Multiplexer 50 and Tri-state buffer 52, and electrical contact 44 (SDO) and electrical contact 46 (SDOD) have been replaced by a single Electrical Contact 48 (SDO). In addition, a new Electrical Contact 48 referred to as SDOSEL (SDO select) has been provided.

In the present embodiment, rather than the data output D of Latch 14 being provided as an input to tri-state buffer tri-state buffer 22, and further provided as an output of tri-state buffer 22 via electrical contact 44 when tri-state buffer 22 is not tri-stated (see FIG. 1), the data output D of Latch 14 is provided as a first input (Signal 13) to Multiplexer 50. Furthermore, rather than the data input of tri-state buffer 24 being electrically coupled to the data output D of Latch 20 (Signal 15) and further provided as an output of tri-state buffer 24 via electrical contact 46 when tri-state buffer 24 is not tri-state (see FIG. 1), the data output D of Latch 20 is provided as a second input (Signal 15) to Multiplexer 50. Multiplexer 50 is electrically coupled to Electrical Contact 48 and configured to receive a select Signal 25 (SDOSEL) to determine which of the first input (Signal 13) and second input (Signal 15) to Multiplexer 50 will be provided as an output of Multiplexer 50. M50 is further coupled to a tri-state buffer 52. Tri-state buffer 52 is configured to receive the output of Multiplexer 50 (Signal 13 or Signal 15) as an input. Tri-state buffer 52 further comprises an output configured to either be in a high-impedance state, or to provide at its output as output Signal 29 the same signal provided at its input (Signal 13 or Signal 15). Tri-state buffer 52 is further configured to receive a control signal (designated Signal 9) and referred to as SDOEB (serial data out enable buffer) to determine whether Tri-state buffer 52 provides at its output the same signal received as its input (Signal 13 or Signal 15), or if its output enters a high-impedance state. The input of tri-state buffer 24 is electrically coupled to the data output D of Latch 20 (Signal 15). It should be appreciated that when the Signal 25 selects Signal 13 as the output of Multiplexer 50, Multiplexer 50 will provide Signal 13 to Tri-state buffer 52, and when Signal 9 is low, Tri-state buffer 52 will further provide that Signal 13 (SDO) as an output Signal 29 via Electrical Contact 48. When the Signal 25 selects Signal 15 as the output of Multiplexer 50, Multiplexer 50 will provide Signal 15 to Tri-state buffer 52, and when Signal 9 is low, Tri-state buffer 52 will further provide that Signal 15 (SDOD) as an output Signal 29 via Electrical Contact 48. In this manner, depending on the value of SDOSEL (Signal 25) and SDOEB (Signal 9), Tri-state buffer 52 will provide at Electrical Contact 48 either an SDO or SDOD signal. In effect, this alternative embodiment allows the elimination of an electrical contact by using a multiplexer to select which of the SDO and SDOD signals will be provided as an output.

It should be appreciated that in alternative embodiments, power up signal states could be used to force the Q outputs of the Universal SPI Device 10 to known pre-determined states. In yet other alternative embodiments, a reset signal could be provided to reset the shift and shadow registers to a known, pre-determined state at startup. In addition, additional parallel interface input and selection pins could be provided to facilitate operation in a parallel bus environment. In still other alternate embodiments, Universal SPI Device 10 could be implemented as one portion of an integrated circuit also having other functional blocks, a processor, memory, logic and interface circuitry. In yet another alternative embodiment, Universal SPI Device 110 could be implemented as a stand-alone integrated circuit.

In an alternative embodiment (not shown), all of the components generally illustrated in FIGS. 1 and 7 may be formed together on a single substrate and provided as a unitary device. In yet another alternative embodiment (not shown), all of the components generally illustrated in FIGS. 1 and 7 may be coupled together in a single module. In still another alternative embodiment, the signals generated by the components generally illustrated in FIGS. 1 and 7 may be implemented in fuses, in other logic, or in processing circuitry configured or programmed to generate the signals, and the signals could be provided via different external connections having more or fewer pins.

Embodiments described herein provide for a Universal SPI interface that can be integrated with various processors, microcontrollers, and other functions, and allow these products to be used with existing off-the-shelf microcontrollers, RF and other devices and systems employing serial and other busses. These embodiments provide for flexibly implementing built-in compatibility with a variety of parallel and serial interfaces, including SPI, without requiring the added cost, complexity, and real estate required by additional interface logic. Providing for products that have built-in compatibility with multiple bus protocols provides the additional advantage of being able to easily drop these new products into existing designs regardless of the existing bus protocol, and without requiring a redesign or major board changes.

In one aspect, a Universal SPI Device is provided that is compatible, without the need for additional interface logic or software, with the SPI bus, existing DSA and other products utilizing a serial bus having a similar interface and protocol to SPI, (but incompatible with SPI), and parallel busses requiring compatibility with 74xx164-type signaling. In an additional aspect, a reduced-pincount Universal SPI device is provided that provides the same universal interface, but using fewer external output pins. The Universal SPI Device can be configured to work in different modes (with different types of busses, interfaces, and protocols) depending on how the inputs of the Universal SPI Device are configured, and to which signals the inputs are connected. Thus, devices achieving design objectives of keeping costs low while increasing flexibility of use of in existing system designs, and achieving interface compatibility with existing devices are provided.

Although the preferred embodiments of the invention have been illustrated and described in detail, it will be readily apparent to those skilled in the art that various modifications may be made therein without departing from the spirit of the invention or from the scope of the appended claims.

What is claimed is:
1. A universal serial bus interface device comprising:
a first latch comprising a first data input, a clock input, a latch enable input, and a first data output; the first latch configured, when an enable signal having a particular logic value is present at the latch enable input, to latch data present on the first data input and provide that data on the first data output responsive to a clock transition of a first type of a signal provided at the clock input, wherein transitioning the enable signal to have a value other than the particular logic value does not change the data stored at the first latch;

a second latch comprising a clock input, a latch enable input electrically coupled to the latch enable input of the first latch, a second data output, and a second data input electrically coupled to the first data output of the first latch, the second latch configured, when an enable signal having the particular logic value is present at the latch enable input, to latch data present on the second data input and provide that data on the second data output responsive to a clock transition of the first type of a signal provided at the clock input, wherein transitioning the enable signal to have a value other than the particular logic value does not change the data stored at the second latch; and a third latch comprising a clock input, a third data output, and a third data input electrically coupled to the second data output of the second latch, the third latch configured to latch data present on the third data input and provide that data on the third data output responsive to a clock transition of a second type of a signal provided at the clock input, wherein the data provided on the third data output is delayed in time relative to the data provided on the second data output of the second latch, and wherein the clock inputs of the first latch, second latch, and third latch are electrically coupled to share the same clock signal.

2. A universal serial bus interface device as claimed in claim 1 further comprising a first buffer comprising a first buffer data output, a first buffer control input, and a first buffer data input electrically coupled to the second data output of the second latch, wherein the first buffer is configured to provide data present on the second data output of the second latch at the first buffer data output responsive to an asserted signal present at the first buffer control input having the particular logic value.

3. A universal serial bus interface device as claimed in claim 2 further comprising a second buffer comprising a second buffer data output, a second buffer control input, and a second buffer data input electrically coupled to the third data output of the third latch, wherein the second buffer is configured to provide data present on the third data output of the third latch at the third buffer data output responsive to an asserted signal present at the second buffer control input having the particular logic value.

4. A universal serial bus interface device as claimed in claim 1 further comprising a second buffer comprising a second buffer data output, a second buffer control input, and a second buffer data input electrically coupled to the third data output of the third latch, wherein the second buffer is configured to provide data present on the third data output of the third latch at the third buffer data output responsive to an asserted signal present at the second buffer control input having the particular logic value.

5. A universal serial bus interface device as claimed in claim 1 further comprising a fourth shadow latch comprising a clock input, a fourth data output, and a fourth data input electrically coupled to the first data output of the first latch, the fourth latch configured to latch data present on the fourth data input and provide that data on the fourth data output responsive to a signal provided at the clock input of the fourth shadow latch.

6. A universal serial bus interface device as claimed in claim 1 further comprising a multiplexer having a select input, a first multiplexer input electrically coupled to the second data output of the second latch, a second multiplexer input electrically coupled to the third data output of the third latch, and a multiplexer output, wherein the multiplexer is configured to provide at the multiplexer output one of data present at the first multiplexer input and data present at the second multiplexer input responsive to a signal present at the select input.

7. A universal serial bus interface device as claimed in claim 5 further comprising a fifth shadow latch comprising a clock input electrically coupled to the clock input of the fourth shadow latch, a fifth data output, and a fifth data input electrically coupled to the second data output of the second latch, the fifth latch configured to latch data present on the fifth data input and provide that data on the fifth data output responsive to a signal provided at the clock input.

8. A universal serial bus interface device as claimed in claim 3 further comprising:

a fourth shadow latch comprising a clock input, a fourth data output, and a fourth data input electrically coupled to the first data output of the first latch, the fourth latch configured to latch data present on the fourth data input and provide that data on the fourth data output responsive to a signal provided at the clock input; and a fifth shadow latch comprising a clock input electrically coupled to the clock input of the fourth shadow latch, a fifth data output, and a fifth data input electrically coupled to the second data output of the second latch, the fifth latch configured to latch data present on the fifth data input and provide that data on the fifth data output responsive to a signal provided at the clock input.

9. A universal serial bus interface device as claimed in claim 3 further comprising a SPI bus having SSB, SCLK, SDI and SDO signals, wherein the latch enable inputs of the first and second latches, and buffer control inputs of the first and second buffers are electrically coupled together and to the SSB signal of the SPI bus, wherein the clock signal of the first latch, second latch, and third latch are electrically coupled together and to the SCLK signal of the SPI bus, wherein the first data input of the first latch is electrically coupled to the SDI signal of the SPI bus, and wherein the second buffer output is electrically coupled to the SDO signal of the SPI bus.

10. A universal serial bus interface device as claimed in claim 3 further comprising a serial bus having SDI, SCLK, and LE signals, wherein the latch enable inputs of the first and second latches, and buffer control inputs of the first and second buffers are electrically coupled together and to ground, wherein ground is the particular logic value, wherein the clock signals of the first latch, second latch, and third latch are electrically coupled together and to the SCLK signal of the serial bus, wherein the first data input of the first latch is electrically coupled to the SDI signal of the serial bus, and wherein at least one of the first and second buffer outputs are electrically coupled to the SDO signal of the serial bus.

11. A universal serial bus interface device as claimed in claim 3 further comprising a serial bus having SDI, SCLK, and LE signals, wherein the buffer control inputs of the first and second buffers are electrically coupled to ground, wherein the latch enable inputs of the first and second latches, and clock inputs of the shadow latches are electrically coupled together and to the LE signal of the serial bus, wherein the clock signals of the first latch, second latch, and third latch are electrically coupled together and to the SCLK signal of the serial bus, wherein the first data input of the first latch is electrically coupled to the SDI signal of the serial bus, wherein at least one of the first and second buffer outputs are electrically coupled to the SDO signal of the serial bus, and wherein the LE signal is held in a logic high state except when new data is being provided to the universal serial bus interface device at the data input of the first latch.

12. A universal serial bus interface device as claimed in claim 8 further comprising a parallel bus, the universal serial bus interface having SDI, SCLK, and LE signals, wherein the latch enable inputs of the first and second latches, and buffer control inputs of the first and second buffers are electrically coupled together and to ground, wherein the clock inputs of the shadow latches are electrically coupled together and to the LE signal, wherein the clock signals of the first latch, second latch, and third latch are electrically coupled together and to the SCLK signal, wherein the first data input of the first latch is electrically coupled to the SDI signal, and wherein at least one of the first and second shadow latch data outputs are electrically coupled to the parallel bus.

13. A universal serial bus interface device as claimed in claim 8 further comprising a parallel bus, the universal serial bus having having SDI, SCLK, and LE signals, wherein the buffer control inputs of the first and second buffers are electrically coupled to ground, wherein the latch enable inputs of the first and second latches, and clock inputs of the shadow latches are electrically coupled together and to the LE signal, wherein the clock signals of the first latch, second latch, and third latch are electrically coupled together and to the SCLK signal, wherein the first data input of the first latch is electrically coupled to the SDI signal, wherein at least one of the first and second shadow latch data outputs are electrically coupled to the parallel bus, and wherein the LE signal is held in a logic high state except when new data is being provided to the universal serial bus interface device at the data input of the first latch.

14. A universal serial bus interface device as claimed in claim 6 further comprising a first buffer comprising a first buffer data output, a first buffer control input, and a first buffer data input electrically coupled to the multiplexer output, wherein the first buffer is configured to provide data present on the multiplexer output at the first buffer data output responsive to a signal present at the first buffer control input.

15. A universal serial bus interface device as claimed in claim 6 further comprising:
a fourth shadow latch comprising a clock input, a fourth data output, and a fourth data input electrically coupled to the first data output of the first latch, the fourth latch configured to latch data present on the fourth data input and provide that data on the fourth data output responsive to a signal provided at the clock input; and
a fifth shadow latch comprising a clock input electrically coupled to the clock input of the fourth shadow latch, a fifth data output, and a fifth data input electrically coupled to the second data output of the second latch, the fifth latch configured to latch data present on the fifth data input and provide that data on the fifth data output responsive to a signal provided at the clock input.

16. A universal serial bus interface device as claimed in claim 14 further comprising:
a fourth shadow latch comprising a clock input, a fourth data output, and a fourth data input electrically coupled to the first data output of the first latch, the fourth latch configured to latch data present on the fourth data input and provide that data on the fourth data output responsive to a signal provided at the clock input; and
a fifth shadow latch comprising a clock input electrically coupled to the clock input of the fourth shadow latch, a fifth data output, and a fifth data input electrically coupled to the second data output of the second latch, the fifth latch configured to latch data present on the fifth data input and provide that data on the fifth data output responsive to a signal provided at the clock input.

* * * * *